US009313005B2

(12) United States Patent
Park et al.

(10) Patent No.: US 9,313,005 B2
(45) Date of Patent: Apr. 12, 2016

(54) METHOD AND USER EQUIPMENT FOR TRANSMITTING CHANNEL STATE INFORMATION AND METHOD AND BASE STATION FOR RECEIVING CHANNEL STATE INFORMATION

(71) Applicant: LG ELECTRONICS INC., Seoul (KR)

(72) Inventors: Hanjun Park, Anyang-si (KR); Hanbyul Seo, Anyang-si (KR); Seungmin Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 14/241,815

(22) PCT Filed: Sep. 25, 2012

(86) PCT No.: PCT/KR2012/007694
§ 371 (c)(1),
(2) Date: Feb. 27, 2014

(87) PCT Pub. No.: WO2013/048079
PCT Pub. Date: Apr. 4, 2013

(65) Prior Publication Data
US 2014/0219238 A1 Aug. 7, 2014

Related U.S. Application Data

(60) Provisional application No. 61/541,086, filed on Sep. 30, 2011.

(51) Int. Cl.
G06F 11/00 (2006.01)
G08C 15/00 (2006.01)
(Continued)

(52) U.S. Cl.
CPC ............. H04L 5/0053 (2013.01); H04B 7/024 (2013.01); H04L 5/0035 (2013.01);
(Continued)

(58) Field of Classification Search
CPC ..................... H04L 5/0057; H04L 5/0035
See application file for complete search history.

(56) References Cited

U.S. PATENT DOCUMENTS

2002/0082021 A1 6/2002 Chen et al.
2008/0014951 A1 1/2008 Laroia et al.
(Continued)

FOREIGN PATENT DOCUMENTS

CN 101779392 7/2010
CN 101998497 3/2011
(Continued)

OTHER PUBLICATIONS

PCT International Application No. PCT/KR2012/007694, Notification of Transmittal of the International Search Report and the Written Opinion of the International Searching Authority, or Declaration dated Feb. 28, 2013, 8 pages.
European Patent Office Application Serial No. 12836544.2 Search Report dated May 8, 2015, 6 pages.
The State Intellectual Property Office of the People's Republic of China Application Serial No. 201280047603.6, Office Action dated Feb. 3, 2016, 7 pages.

Primary Examiner — Maharishi Khirodhar
(74) Attorney, Agent, or Firm — Lee, Hong, Degerman, Kang & Waimey

(57) ABSTRACT

Disclosed herein is a method for, at a user equipment (UE) capable of being served by a plurality of base stations, transmitting channel state information to at least one of the base stations in a wireless communication system. The method includes receiving resource allocation information on allocation of time-frequency resources used to transmit supplemental channel state information for a neighboring base station from a serving base station of the UE, and transmitting supplemental channel state information for the neighboring base station to the serving base station, using part of time-frequency resources allocated for transmission of channel state information for the serving base station, based on the resource allocation information.

15 Claims, 13 Drawing Sheets

(51) Int. Cl.
  *H04L 5/00*  (2006.01)
  *H04B 7/02*  (2006.01)
  *H04W 72/04* (2009.01)
  *H04B 7/06*  (2006.01)
  *H04L 5/14*  (2006.01)

(52) U.S. Cl.
  CPC ........... *H04L 5/0073* (2013.01); *H04L 5/0091* (2013.01); *H04W 72/044* (2013.01); *H04B 7/063* (2013.01); *H04B 7/0632* (2013.01); *H04B 7/0639* (2013.01); *H04L 5/0012* (2013.01); *H04L 5/1469* (2013.01)

(56) References Cited

U.S. PATENT DOCUMENTS

2011/0237272 A1   9/2011  Gorokhov et al.
2012/0134275 A1*  5/2012  Choi et al. .................... 370/241

FOREIGN PATENT DOCUMENTS

| KR | 10-2009-0062435 | 6/2009 |
| WO | 2008/153298 | 12/2008 |
| WO | 2011/010863 | 1/2011 |
| WO | 2011/020258 | 2/2011 |

* cited by examiner

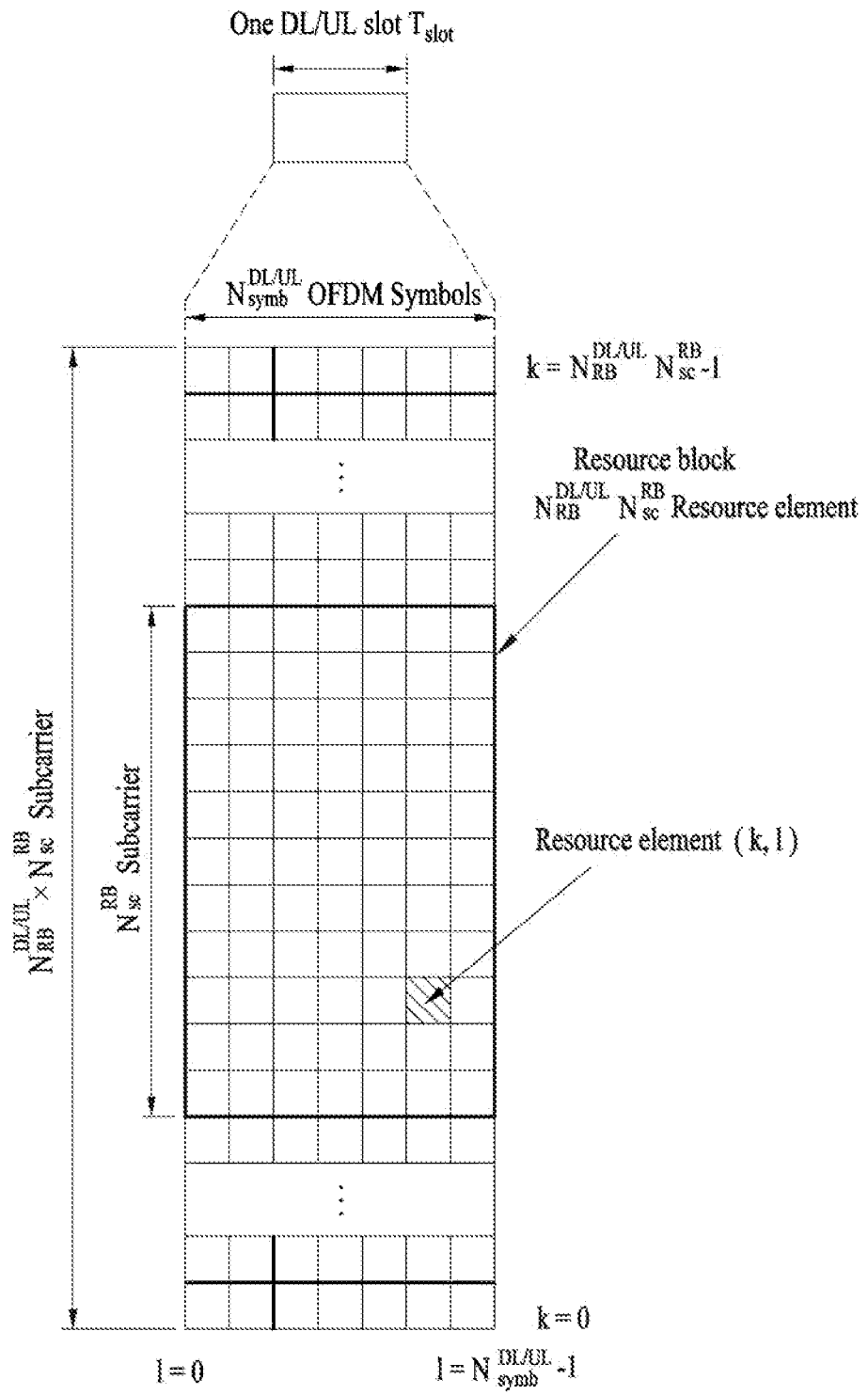

METHOD AND USER EQUIPMENT FOR TRANSMITTING CHANNEL STATE INFORMATION AND METHOD AND BASE STATION FOR RECEIVING CHANNEL STATE INFORMATION

CROSS-REFERENCE TO RELATED APPLICATIONS

This application is the National Stage filing under 35 U.S.C. 371 of International Application No. PCT/KR2012/007694, filed on Sep. 25, 2012, which claims the benefit of U.S. Provisional Application Ser. No. 61/541,086, filed on Sep. 30, 2011, the contents of which are hereby incorporated by reference herein in their entirety.

BACKGROUND OF THE INVENTION

1. Field of the Invention

The present invention relates to a wireless communication system, and more particularly, to a method and apparatus for transmitting or receiving channel state information in a multiple input multiple output (MIMO) system supporting coordinated transmission.

2. Brief Description of the Background Art

Various apparatuses and techniques such as smart phones or tablet PCs requiring machine-to-machine (M2M) communication and high data transmission rate have appeared. Accordingly, the amount of data to be processed in a cellular network has rapidly increased. In order to cope with rapid increase in the amount of processed data, a carrier aggregation technique and cognitive radio technique for efficiently utilizing a larger frequency band, a MIMO technique and multiple base station coordination technique for increasing a data capacity transmitted within a restricted frequency band, etc. have been developed.

Among others, in order to improve performance of a wireless communication system, a coordinated multiple point transmission and reception (CoMP) scheme has been proposed. The CoMP scheme is expected to improve performance of a user equipment (UE) located at a cell edge and improve average sector throughput. However, even when the CoMP scheme is applied, inter-cell interference (ICI) which reduces the performance of a UE located at a cell edge still occurs, thus there is an issue for channel estimation of a UE which is provided with a communication service using the CoMP scheme.

In order to maximize efficiency of a transmission and reception scheme such as a CoMP scheme, a channel state between a base station and a user equipment (UE) should be accurately estimated. However, up to now, a method of obtaining channel state information of a wireless communication system using a CoMP scheme has not been defined.

The technical problems solved by the present invention are not limited to the above technical problems and other technical problems which are not described herein will become apparent to those skilled in the art from the following description.

SUMMARY OF THE INVENTION

The object of the present invention can be achieved by providing a method for, at a user equipment (UE) capable of being served by a plurality of base stations, transmitting channel state information to at least one of the base stations in a wireless communication system, the method including receiving resource allocation information on allocation of time-frequency resources used to transmit supplemental channel state information for a neighboring base station from a serving base station of the UE, and transmitting supplemental channel state information for the neighboring base station to the serving base station, using part of time-frequency resources allocated for transmission of channel state information for the serving base station, based on the resource allocation information.

Preferably, the supplemental channel state information for the neighboring base station may be periodically transmitted.

Preferably, the channel state information for the serving base station and the supplemental channel state information for the neighboring base station may be transmitted together in a period for transmission of the supplemental channel state information.

Preferably, both the channel state information for the serving base station and the supplemental channel state information for the neighboring base station transmitted in the period for transmission of the supplemental channel state information may be wideband channel state information.

Preferably, the resource allocation information may be transmitted via a higher layer signal.

Preferably, the method may further include adding identification information for the serving base station or the neighboring base station to the channel state information for the serving base station and the supplemental channel state information for the neighboring base station, respectively.

The method may further include, if the serving base station of the UE is switched to the neighboring base station, transmitting only subband channel state information for the switched serving base station during a predetermined period after switching.

In another aspect of the present invention, provided herein is a user equipment (UE) which is served by a plurality of base stations in a wireless communication system and transmits channel state information to at least one of the base stations, the UE including a radio frequency (RF) unit, and a processor, wherein the processor is configured to receive resource allocation information on allocation of time-frequency resources used to transmit supplemental channel state information for a neighboring base station from a serving base station of the UE and enable the RF unit to transmit supplemental channel state information for the neighboring base station to the serving base station, using part of time-frequency resources allocated for transmission of the channel state information for the serving base station, based on the resource allocation information.

Preferably, the supplemental channel state information for the neighboring base station may be periodically transmitted.

Preferably, the processor may be configured to enable the RF unit to transmit the channel state information for the serving base station and the supplemental channel state information for the neighboring base station together in a period for transmission of the supplemental channel state information.

Preferably, both the channel state information for the serving base station and the supplemental channel state information for the neighboring base station transmitted in the period for transmission of the supplemental channel state information may be wideband channel state information.

Preferably, the resource allocation information may be transmitted via a higher layer signal.

Preferably, the processor may be configured to add identification information of the serving base station or the neighboring base station to the channel state information for the serving base station and the supplemental channel state information for the neighboring base station, respectively.

Preferably, if the serving base station of the UE is switched to the neighboring base station, the processor may be configured to transmit only subband channel state information for the switched serving base station through the RF unit during a predetermined period after switching.

In a further aspect of the present invention, provided herein is a method for, at a base station, receiving channel state information from a user equipment (UE) in a wireless communication system, the method including transmitting, to the UE, resource allocation information of time-frequency resources used to transmit supplemental channel state information for a neighboring base station, and receiving, from the UE, the supplemental channel state information for the neighboring base station based on the resource allocation information, wherein the time-frequency resources used to transmit the supplemental channel state information for the neighboring base station are part of time-frequency resources allocated for transmission of the channel state information of the base station.

In a further aspect of the present invention, provided herein is a base station for receiving channel state information from a user equipment (UE) in a wireless communication system, the base station including a radio frequency (RF) unit, and a processor, wherein the processor may be configured to enable the RF unit to transmit resource allocation information of time-frequency resources used to transmit supplemental channel state information for a neighboring base station to the UE, and receive the supplemental channel state information for the neighboring base station based on the resource allocation information from the UE, and wherein the time-frequency resources used to transmit the supplemental channel state information of the neighboring base station are part of time-frequency resources allocated for transmission of the channel state information of the base station.

The methods for solving the problems are merely some of the embodiments of the present invention and various embodiments having the technical features of the present invention are derived and understood by those skilled in the art from the detailed description of the present invention.

The present invention may be used to estimate a channel state during an initial period after a serving base station is changed due to switching a CoMP scheme.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 2 is a diagram showing an example of a downlink/uplink (DL/UL) slot structure in a wireless communication system;

DETAILED DESCRIPTION OF THE INVENTION

Figure 1A:
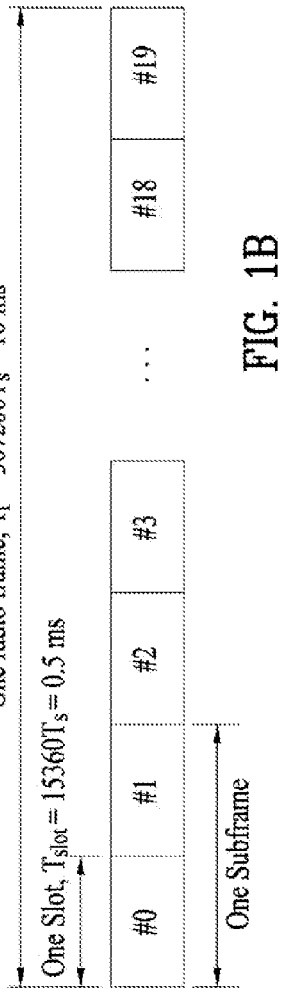
FIGS. 1A and 1B are diagrams showing an example of a radio frame structure used in a wireless communication system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) may be fixed or mobile and include various apparatuses which communicate with a base station (BS) and transmit and receive user data and/or a variety of control information. The UE may be referred to as a terminal Equipment, a mobile station (MS), a mobile terminal (MT), a user terminal (UT), a subscriber station (SS), a wireless device, a personal digital assistant (PDA), a wireless modem, a handheld device, etc. In the present invention, a base station (BS) refers to a fixed station which communicates with a UE and/or another BS and exchanges a variety of data and control information. The BS is referred to as an advanced base station (ABS), a node-B (NB), an evolved-NodeB (eNB), a base transceiver system (BTS), an access point (AP), a processing server (PS), etc.

In the present invention, a PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) refers to a set of resource elements or a set of time-frequency resources carrying DCI (Downlink Control Information)/CFI (Control Format Indicator)/downlink ACK/NACK (ACKnowlegement/Negative ACK)/downlink data. In addition, a PUCCH (Physical Uplink Control CHannel)/PUSCH (Physical Uplink Shared CHannel) refers to a set of resource elements or a set of time-frequency resources carrying UCI (Uplink Control Information)/uplink data. In the present invention, in particular, time-frequency resources or resource elements (REs) allocated to or belonging to PDCCH/PCFICH/PHICH/PDSCH/PUCCH/PUSCH are referred to as PDCCH/PCFICH/PHICH/PDSCH/PUCCH/PUSCH REs or PDCCH/PCFICH/PHICH/PDSCH/PUCCH/PUSCH resources. Accordingly, in the present invention, transmission of a PUCCH/PUSCH by a UE means that an uplink control information/uplink data/random access signal is transmitted on a PUCCH/PUSCH. In the present invention, transmission of a PDCCH/PCFICH/PHICH/PDSCH by a BS means that downlink data/control information is transmitted on a PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

Figure 1B:
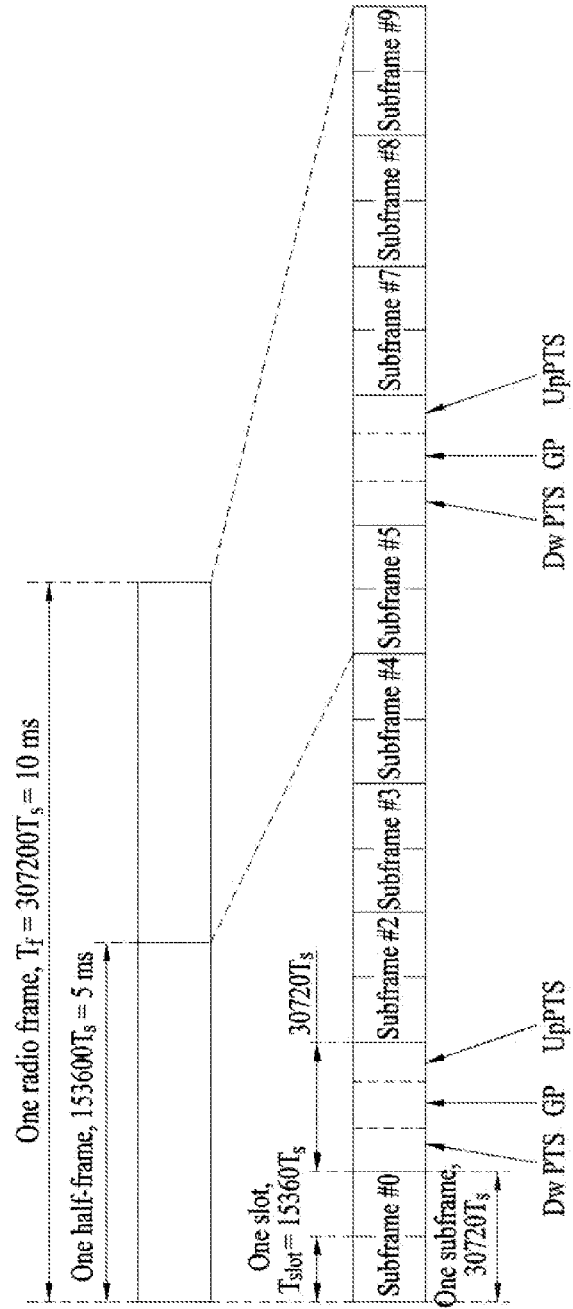

FIGS. 1A and 1B are diagrams showing the structure of a radio frame used in a wireless communication system. In particular, FIG. 1A shows a radio frame structure used in frequency division duplex (FDD) in 3GPP LTE(-A) and FIG. 1B shows a radio frame structure used in time division duplex (TDD) in 3GPP LTE(-A).

Referring to FIG. 1A, a radio frame used in 3GPP LTE(-A) has a length of 10 ms (3070200*Ts) and includes 10 subframes with the same size. The 10 subframes of the radio frame may be numbered. Ts denotes sampling time, and is represented by Ts=1/(2048*15 kHz). Each of the subframes has a length of 1 ms and includes two slots. The 20 slots of one radio frame may be sequentially numbered from 0 to 19. Each of the slots has a length of 0.5 ms. A time for transmitting one subframe is defined as a transmission time interval (TTI). Time resources may be divided by a radio frame number (or a radio frame index), a subframe number (or a subframe index), a slot number (or a slot index), etc.

The radio frame may be differently configured according to duplex mode. For example, in an FDD mode, since downlink (DL) transmission and uplink (UL) transmission are divided according to frequency, a radio frame includes only one of a DL subframe or a UL subframe in a predetermined frequency band of a predetermined carrier frequency. In a TDD mode, since downlink (DL) transmission and uplink (UL) transmission are divided according to time, a radio frame includes both a DL subframe and a UL subframe in a predetermined frequency band of a predetermined carrier frequency.

Table 1 shows a DL-UL configuration of subframes within a radio frame, in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes three fields of DwPTS (Downlink Pilot TimeSlot), GP (Guard Period) and UpPTS (Uplink Pilot TimeSlot). DwPTS is a time slot reserved for DL transmission and UpPTS is a time slot reserved for UL transmission.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes $N^{DL/UL}_{RB} * N^{RB}_{sc}$ subcarriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g., 7) consecutive OFDM symbols in a time domain and defined as $N^{RB}_{sc}$ (e.g., 12) consecutive subcarriers in a frequency domain. For reference, resource including one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index applied from 0 to $N^{DL/UL}_{RB} * N^{RB}_{sc} - 1$ in a frequency domain, and l is an index from 0 to $N^{DL/UL}_{symb} - 1$ in a time domain.

In one subframe, two RBs respectively located in two slots of the subframe while occupying the same $N^{RB}_{sc}$ consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, $n_{PRB} = N^{DL}_{RB}$. The localized VRBs are numbered from 0 to $N^{DL}_{VRB} - 1$ and $N^{DL}_{VRB} = N^{DL}_{RB}$. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

Figure 3:
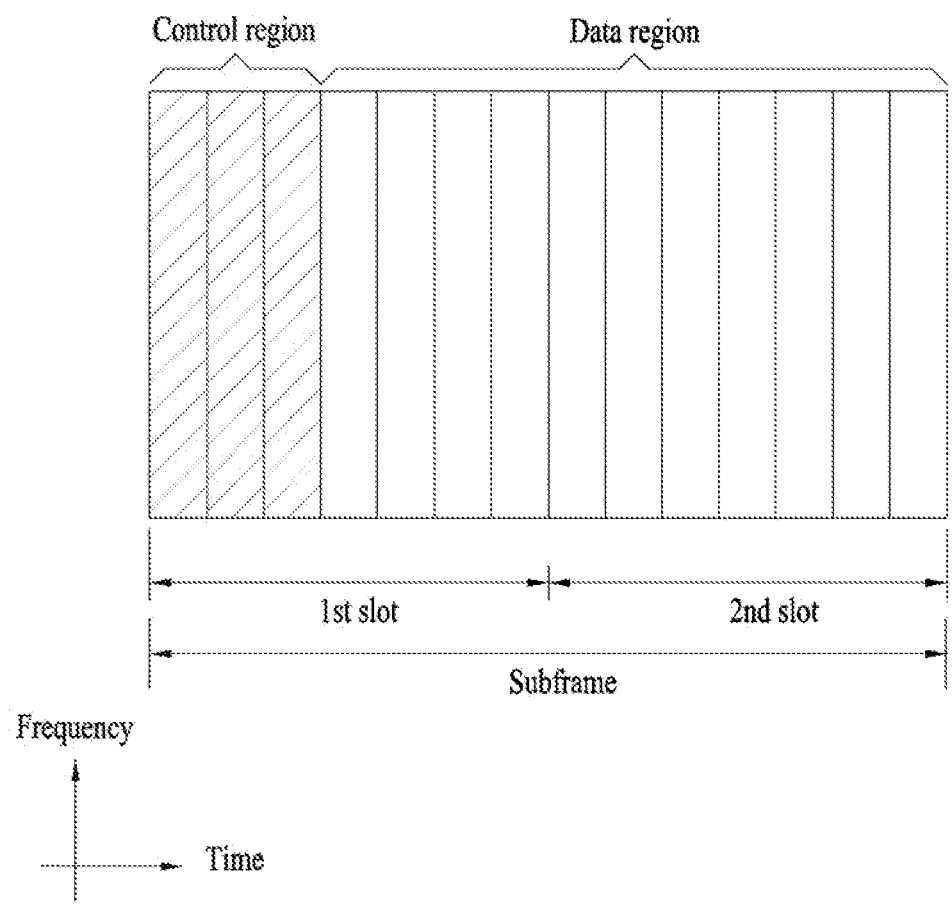
FIG. 3 is a diagram showing a downlink subframe structure used in a 3GPP LTE(-A) system.

FIG. 3 is a diagram showing a downlink subframe structure used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbols used in the control region correspond to the data region to which a physical downlink shared channel (PDSCH) is allocated. Hereinafter, a resource region available for PDSCH transmission in a DL subframe is referred to as a PDSCH region. Examples of a DL control channel used in 3GPP LTE include PCFICH (Physical Control Format Indicator Channel), PDCCH (Physical Downlink Control Channel), PHICH (Physical hybrid ARQ indicator Channel), etc. The PCFICH is transmitted in a first OFDM symbol of a subframe and carries information about the number of OFDM symbols used for transmission of a control channel within a subframe. The PHICH carries a HARQ ACK/NACK (acknowledgment/negative-acknowledgment) as a response to UL transmission.

Control transmitted via a PDCCH is referred to as downlink control information (DCI). The DCI includes resource allocation information of a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a Tx power control command set of individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
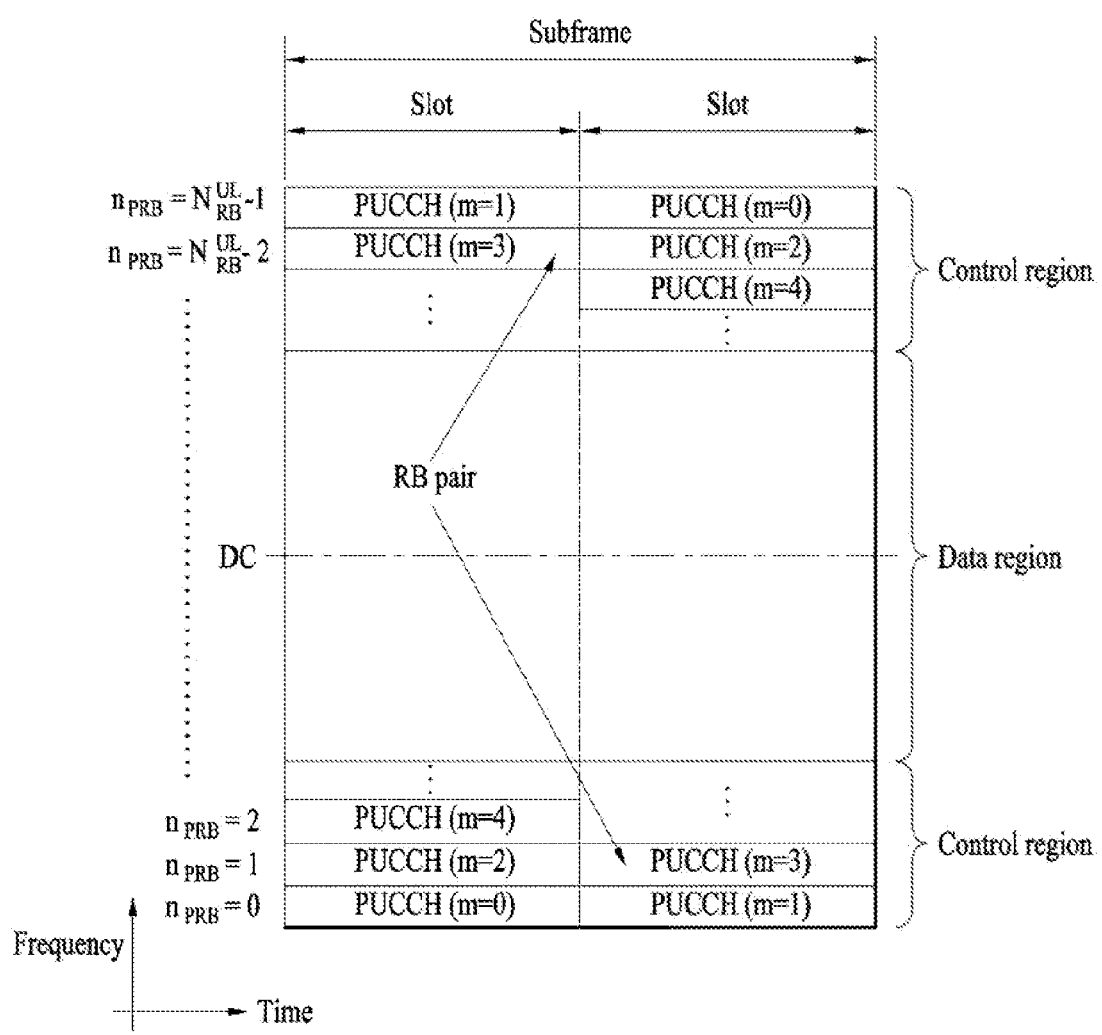
FIG. 4 is a diagram showing an example of an uplink subframe structure used in a 3GPP LTE(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

less communication system. A coordinated multiple point transmission and reception set including a plurality of BSs is referred to as a CoMP set. Some or all BSs belonging to a CoMP set may participate in CoMP for a UE according to channel state. Each BS may include a plurality of antenna ports.

Figure 5A:
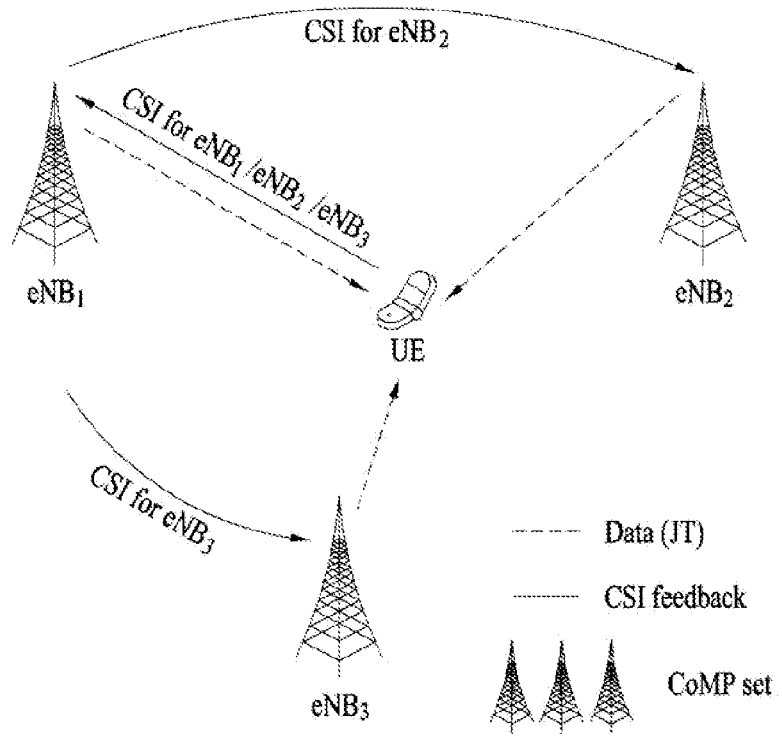
FIGS. 5A and 5B are diagrams showing an example of a wireless communication system to which a coordinated multiple point transmission and reception (CoMP) scheme is applied.
Figure 5B:
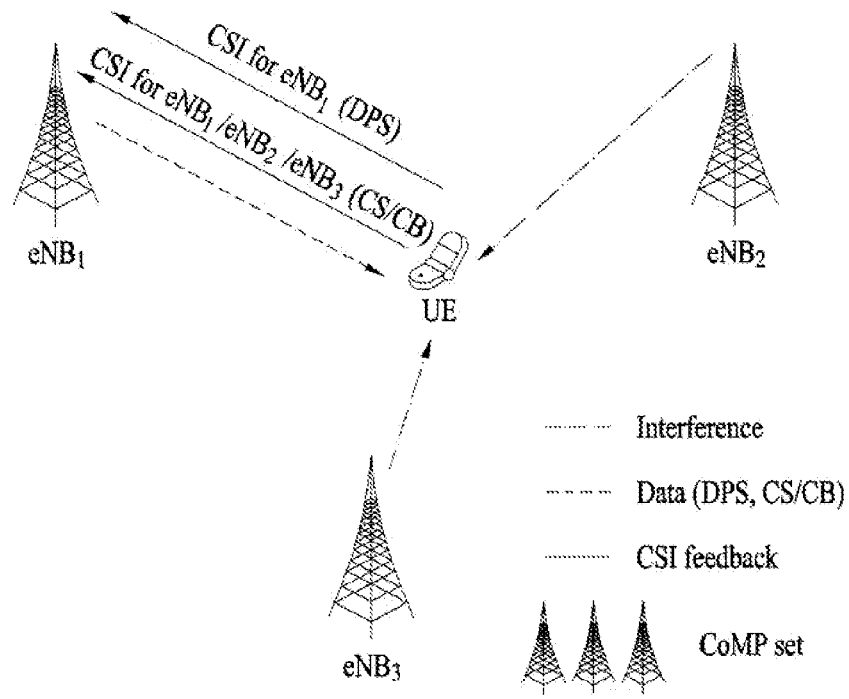

Referring to FIGS. 5A and 5B, a plurality of BSs is located in the vicinity of a UE and the UE may be connected to a first BS ($eNB_1$), a second BS ($eNB_2$) and a third BS ($eNB_3$) and, more particularly, a plurality of antenna ports of the first, second and third BSs. The UE may report channel state information for the plurality of antenna ports to a network. That is, the UE may transmit channel state information for the plurality of antenna ports to a BS to which the UE is connected. The network performs scheduling of the UE based on the channel state information.

In the present invention, the channel state information indicates information indicating quality of a radio channel (or a link) established between a UE and an antenna port or a BS. For example, the channel state information includes a channel quality indicator (CQI), a rank index (RI), a precoding matrix index (PMI), etc.

For interference signal reduction, estimation of a channel state between a BS and a UE and demodulation of a signal transmitted between a BS and a UE, various reference signals (RSs) are transmitted between the BS and the UE. The RS is a predefined signal known to a UE and a BS and having a special waveform, which is transmitted from the BS to the UE or from the UE to the BS, and is also referred to as a pilot signal. In 3GPP LTE release-8 (Rel-8), a cell-specific reference signal (CRS) is proposed for the purpose of channel measurement for CQI feedback and demodulation of a PDSCH. However, in the 3GPP LTE release-10 (Rel-10), a channel state information reference signal (CSI-RS) for CSI feedback is proposed separately from the CRS of Rel-8.

TABLE 2

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are used to transmit ACK/NACK information and PUCCH format 2 series are mainly used to carry channel state information such as CQI (channel quality indicator)/PMI (precoding matrix index)/RI (rank index).

FIGS. 5A and 5B are diagrams showing an example of a wireless communication system to which a coordinated multiple point transmission and reception (CoMP) scheme is applied. Although three BSs ($eNB_1$, $eNB_2$ and $eNB_3$) are shown, a larger number of BSs may participate into the wire- Each BS may transmit a CSI-RS for channel measurement to a UE through a plurality of antenna ports and each UE may calculate channel state information based on the CSI-RS and transmit the calculated channel state information to each BS.

FIG. 5A shows a wireless communication system in which a UE is provided with a joint transmission (JT) served by a CoMP group. In FIG. 5A, the UE receives data from all BSs belonging to a CoMP group and thus the UE may transmit channel state information for all BSs belonging to the CoMP group.

FIG. 5B shows a wireless communication system in which a UE is served by a CoMP group using a coordinated scheduling (CS)/coordinated beamforming (CB) scheme or a dynamic point selection (DPS) scheme. If the CS/CB scheme is applied, a first BS may transmit data to the UE. A second BS and a third BS do not transmit data to the UE, but may cause interference to the UE generated due to their data transmission. Accordingly, the second BS and the third BS select a precoding scheme in order to reduce interference to the UE and thus the UE may feed back to the first BS, the channel state information for the second and third BSs as well as the channel state information for the first BS. If the DPS scheme is applied, the UE may be served by one selected BS having best transmission performance from the CoMP group. The UE may feed back to the first BS the channel state information for the first BS while receiving data from the first BS selected according to the DPS scheme. Meanwhile, the second and third BSs do not transmit data for the UE. At this time, the UE does not transmit the channel state information for the second and third BSs to the second and third BSs. After a predetermined time, if the second BS is selected as a new BS according to the DPS scheme, the UE may receive data from the second BS and transmit the channel state information for the second BS to the second BS. In FIGS. 5A and 5B, the channel state information does not necessarily need to be transmitted to one BS of the CoMP group and may be transmitted to each BSs if necessary.

Figure 6A:
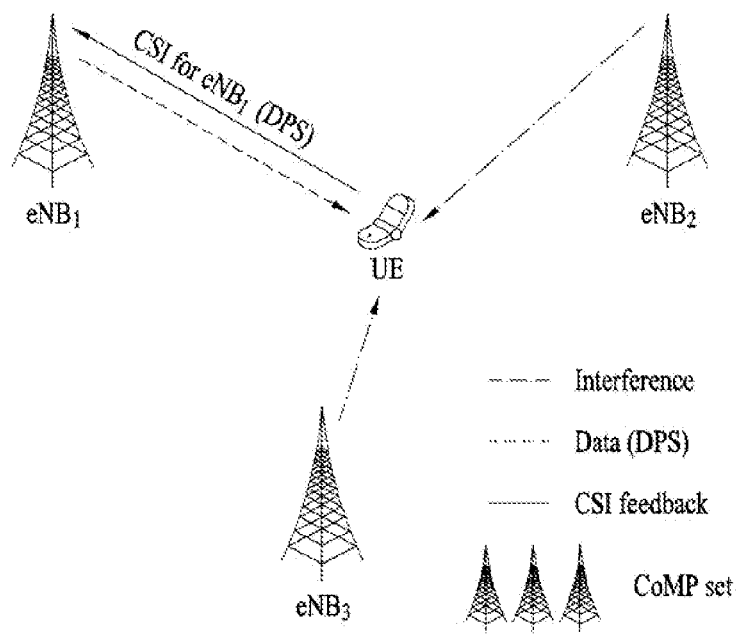
FIGS. 6A and 6B are diagrams showing an example of a wireless communication system for transmitting an uplink control channel in application of a CoMP scheme according to an embodiment of the present invention.
Figure 6B:
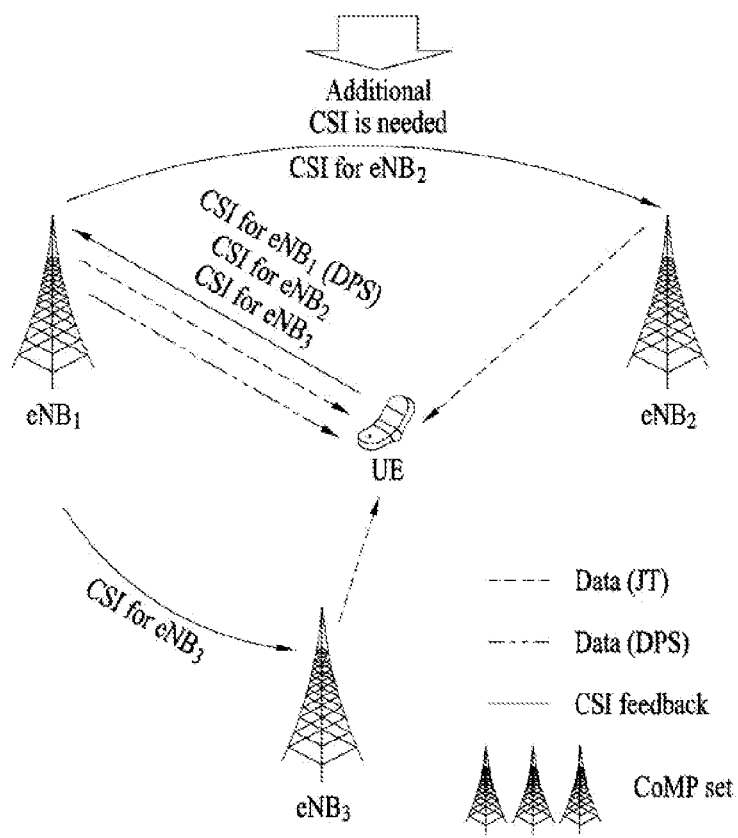

The necessary channel state information is changed according to the CoMP scheme described with reference to FIGS. 5A and 5B and thus the structure of the channel state information supporting each CoMP scheme is also changed. However, if a direct or indirect channel state information feedback loop is supported with respect to some of BSs partitioning in the CoMP scheme, there are functions which cannot be immediately performed only using the channel state information received up to now in a CoMP operation such as change in CoMP scheme according to change in UE environment. That is, if a CoMP scheme is switched into another one in which the channel state information for the BSs which do not have a channel state information feedback loop is required, the switched CoMP scheme may be normally performed after all channel state information necessary for the changed CoMP scheme is obtained. For example, in a CoMP group to which the DPS scheme is applied, a UE transmits only channel state information for a selected BS according to the DPS scheme and does not transmit channel state information for other unselected BSs in the CoMP group. Accordingly, when the CoMP scheme for the UE is switched from the DPS scheme to the JT scheme or the CS/CB scheme, time delay occurs until the channel state information of the BSs which were not selected in the process of performing the DPS scheme is obtained. Accordingly, in the present invention, in order to solve such a problem, the UE transmits supplemental channel state information for BS(s) which do not participate in the CoMP of the BS so as not to establish a channel state information feedback loop. According to the present invention, the supplemental channel state information may assist in selection of a new BS which will be responsible for transmitting data when the DPS scheme is performed. FIGS. 6A and 6B show an example of supplemental channel state information transmission.

FIGS. 6A and 6B are diagrams showing an example of a wireless communication system for transmitting an uplink control channel in application of a CoMP scheme according to an embodiment of the present invention. FIG. 6A shows a wireless communication system in which a UE receives data from a BS using a DPS scheme. In the DPS scheme, a first BS selected as a transmission point (TP) may transmit data to the UE and the UE may feed back to the first BS channel state information for the first BS. The BSs (second and third BSs) of the CoMP group, which do not participate in data transmission of the UE, cause interference to the UE. If the CoMP scheme is switched from the DPS scheme to the JT scheme, the channel state information for the BSs which participate in the CoMP group but did not have a channel state information feedback loop before switching of the CoMP scheme, that is, the second and third BSs, is not collected in an initial time after switching. Accordingly, time delay necessarily occurs until the CoMP scheme is completely provided. In order to eliminate or reduce such time delay, feedback of the channel state information for the TPs other than a TP for data transmission, which belongs to the CoMP group, is proposed even when the CoMP scheme such as the DSP scheme is applied. This is shown in FIG. 6B.

In FIG. 6B, the UE may receive data from the first BS using the DPS scheme and transmit the channel state information for the second and third BSs as well as the channel state information for the first BS to the first BS. The channel state information for the second and third BSs which do not transmit data to the UE using the CoMP scheme is referred to as "supplemental channel state information" in the present specification and is differentiated from the "channel state information" for the TP or BS for directly transmitting data to the UE. Accordingly, in the DPS scheme, the UE may transmit the supplemental channel state information for the neighboring BSs (second and third BSs) as well as the channel state information for the first BS designated as the TP. Then, even when the CoMP scheme is switched from the DPS scheme to the JT scheme, the channel state necessary to perform the JT scheme may be estimated through the channel state information for the second and third BSs, which was transmitted as the supplemental channel state information before switching.

Resources for the supplemental channel state information may be part of time-frequency resources for the existing channel state information. Since the supplemental channel state information is not used in the CoMP scheme before switching, it is set that a transmission periodicity for the supplemental channel state information is relatively longer than that of the existing channel state information and restricted channel information are included. In accordance with one embodiment of the present invention, proposed is a structure of channel state information (or a time-frequency resource structure) supporting flexible switching of the CoMP scheme so as to realize a more efficient CoMP scheme. In the present specification, the structure of the channel state information is referred to as a structure of time-frequency resources allocated for channel state information transmission. In particular, the proposed structure of the channel state information is expected to be widely used in a system to which the DPS scheme is applied. Hereinafter, as the embodiments of the present invention, the operation principle of the present invention proposed will be described with respect to an environment requiring additional channel state information for TPs unselected from the CoMP group to which the DPS scheme is applied. For convenience of description, the structure of PUCCH based periodic channel state information of the 3GPP LTE(-A) system is assumed, however the present invention is not limited to the above system and is applicable to the general structure of channel state information.

According to the embodiment of the present invention, in order to support a DPS scheme, the structure of channel state information including TP index information will be described. The structure of the PUCCH-based channel state information of the 3GPP LTE(-A) system is roughly divided into resources for transmitting PMI and CQI and resources for transmitting RI. At this time, since the RI is not sensitive to time variation, the RI is transmitted with a transmission periodicity which is a multiple of a transmission periodicity of the PMI and CQI. Further, since a subframe offset of the PMI and CQI and a subframe offset of the RI have different values, and the RI and the PMI/CQI are transmitted in different resources.

Figure 7:
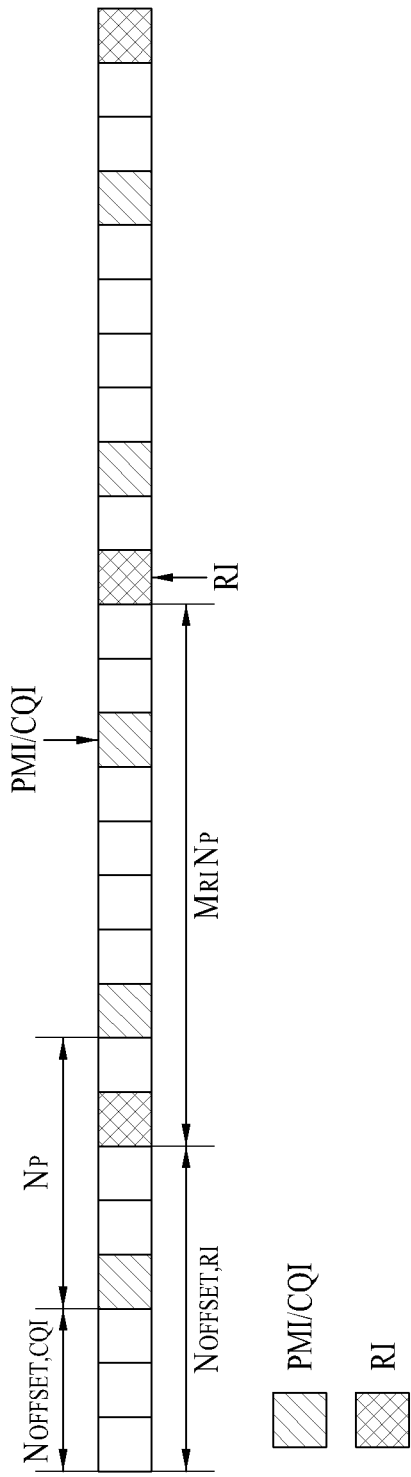
FIG. 7 is a diagram showing an example of a time-frequency structure of an uplink control channel used in a 3GPP LTE(-A) system.

For example, when only wideband channel state information is transmitted, a time point when the PMI and CQI are transmitted and a time point when the RI is transmitted are expressed by the following equation. The time point can be expressed as time resource such as a frame of a subframe.

$$PMI/CQI: 10 \times n_f - \lfloor n_s/2 \rfloor - N_{OFFSET,CQI}) \bmod N_P = 0$$

$$RI: 10 \times n_f - \lfloor n_s/2 \rfloor - N_{OFFSET,CQI} - N_{OFFSET,RI}) \bmod N_P \cdot M_{RI} = 0 \qquad \text{Equation 1}$$

where, $n_f$ denotes a system frame number, $n_s$ denotes a slot number in a subframe, $N_{OFFSET,RI}$ and $N_{OFFSET,CQI}$ respectively denote subframe offsets of the RI, and the PMI and CQI, and $N_P$ and $N_P \cdot M_{RI}$ respectively denote transmission periodicity of the PMI and CQI and transmission periodicity of the RI. FIG. 7 shows the structure of channel state information when channel state information is periodically transmitted to a single TP at the transmission time point of the channel state information determined by Equation 1.

Figure 8:
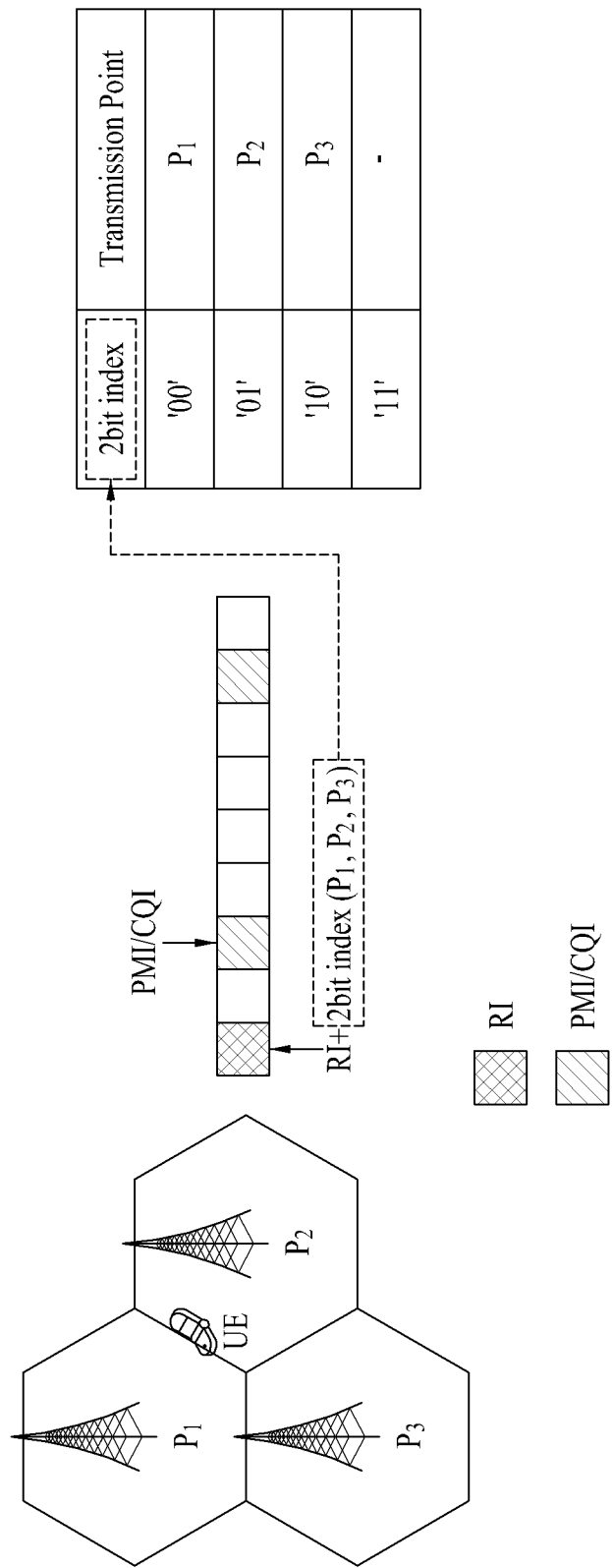
FIG. 8 is a diagram showing information added to an uplink control channel according to an embodiment of the present invention.

However, when considering the structure for transmitting channel state information for a TP having an excellent channel state according to a DPS scheme, channel information included in the channel state information is for different TPs. Accordingly, it is necessary to include information indicating a TP (or TPs) for which the channel state information is currently transmitted. In the present invention, an environment in which a DPS scheme is performed is considered based on the transmission periodicity of the RI and proposed is a method of adding information on a TP index to an RI. For example, FIG. 8 shows the structure of channel state information indicating to which TP channel state information is transmitted, by adding 2-bit information to an RI where three TPs support a DPS scheme in a hexagonal cell structure. The 2-bit index information is exemplary and less or more bits may be used to indicate a TP for which the channel state information is fed back. Meanwhile, according to the embodiment of the present invention, it is preferable to indicate a transmission point (TP) which is selected by a DPS scheme using some resources such as a CIF of a PDCCH and to which a PUCCH based CSI is fed back.

Figure 9A:
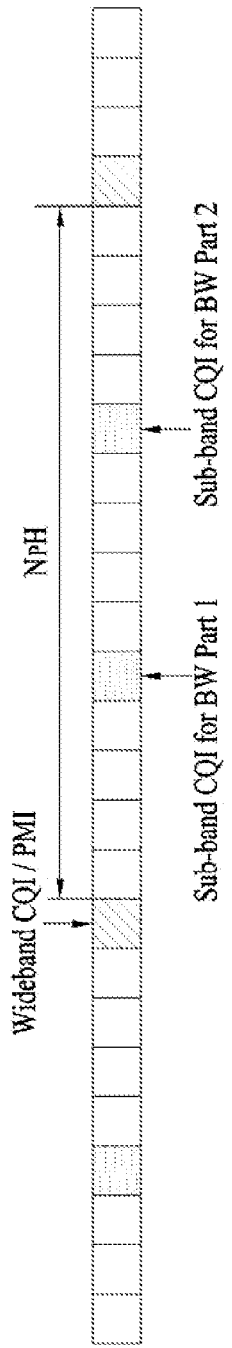
FIGS. 9A and 9B are diagrams showing an example of a time-frequency structure of an uplink control channel used in a 3GPP LTE(-A) system.
Figure 9B:
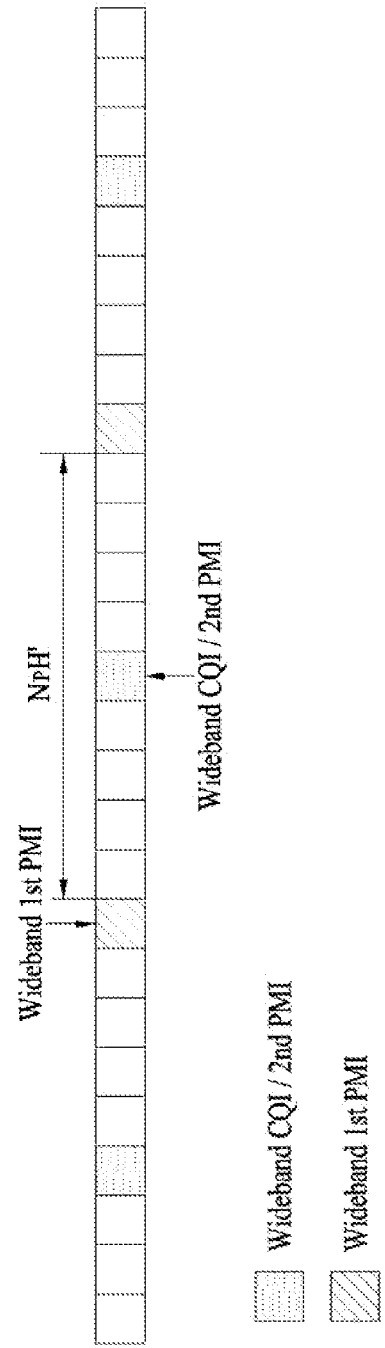

FIGS. 9A and 9B are diagrams showing an example of a channel state information structure of an uplink control channel used in a 3GPP LTE(-A) system. According to the embodiment of the present invention, a method for determining a minimum value of an RI transmission periodicity as a TP switching period will be described according to a PMI and CQI transmission structure in the structure of the channel state information for the DPS scheme. In the 3GPP LTE(-A) system according to the embodiment of the embodiment of the present invention, the PMI and CQI may be transmitted in various formats. For example, the CQI may be transmitted in a wideband or subband channel. FIG. 9A shows a PMI and CQI transmission structure when a subband CQI is transmitted.

FIG. 9B shows the structure of channel state information for transmitting a primary PMI and a wideband CQI, and a secondary PMI when a precoding type indicator (PTI) is set to 0 in an 8-port antenna structure. Here, H and H' are variables for determining a transmission periodicity of wideband channel state information and variable determined by a higher layer. At this time, in a system to which a DPS scheme is applied, if a TP is switched to a new TP in a period shorter than a transmission periodicity (e.g., $N_P H$ and $N_P H'$) of wideband channel state information, the channel state information may not be completely transmitted and thus a channel state information feedback operation may not be completed. Accordingly, in the present invention, a DPS management structure for being capable to switch a TP of a DPS based on the transmission periodicity of an RI is proposed and thus the transmission periodicity of the RI is set to a period larger than the transmission periodicity of the wideband channel state information. In other words, in the structure of the channel state information, a period for selecting or switching a TP of a DPS scheme is determined based on the transmission periodicity of the RI and the TP of the DPS scheme may be selected or switched with periodicity which is a multiple of the transmission periodicity of the RI. In meantime, the selecting or switching is not explicitly performed or occurred if the TP has best channel state during at least two period, the TP maintains a role of transmission point).

Figure 10:
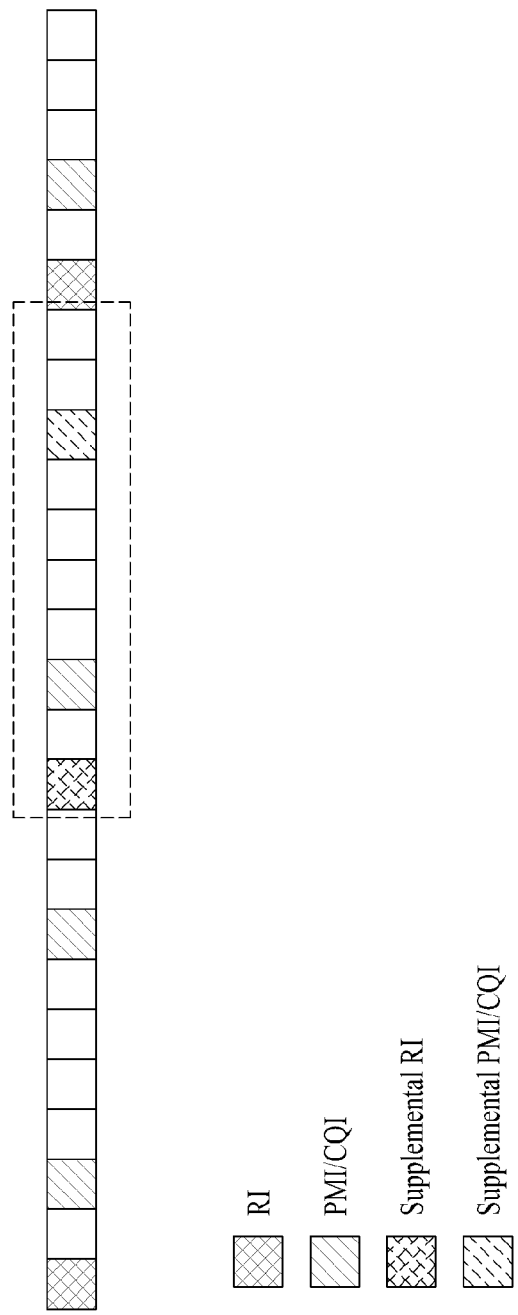
FIG. 10 is a diagram showing an example of a time-frequency structure of an uplink control channel according to an embodiment of the present invention.

FIG. 10 is a diagram showing an example of a channel state information structure of an uplink control channel according to an embodiment of the present invention. As described above, according to the embodiment of the present invention, a method for borrowing some resources allocated to channel state information and transmitting supplemental channel state information will be described. Hereinafter, in the present specification, the term "existing resources" or "existing transmission resources of the channel state information" refers to time-frequency resources allocated for transmission of channel state information to a serving BS, to which supplemental channel state information is not applied. Resources used to transmit supplemental channel state information for TPs which participate in a CoMP scheme but do not have a channel state information feedback loop may be allocated by borrowing some transmission resources of the existing channel state information allocated as shown in FIG. 7. A BS may allocate existing resources and a UE may receive allocation information of the existing resources from the BS. The BS may also allocate resources for transmitting the supplemental channel state information and the UE may receive resource allocation information for transmission of the supplemental channel state information from the BS. In the present invention, as the method for borrowing the transmission resources of the supplemental channel state information, two schemes may be considered, one is a semi-static scheme for borrowing resources according to a specific pattern and another is a threshold scheme for borrowing resources when a specific condition is satisfied. As an example of the semi-static scheme, as shown in FIG. 10, a method for borrowing every Lth resource of the existing RI resources as the RI resources for the supplemental channel state information and borrowing part of the existing PMI and CQI resources as PMI and CQI resources for supplemental channel state information within the transmission periodicity of the RI may be considered.

As a detailed example, in a process of borrowing resources of supplemental channel state information, every $L_{RI}$-th resource of the existing RI resources may be selected using a variable such as $L_{RI}$ determined by a higher layer and may be allocated as supplemental RI resources. Since transmission of the existing channel state information is for periodic transmission, the transmission structure of the existing channel state information also has a periodic structure. Accordingly, a transmission period to which every $L_{RI}$-th resource allocated as supplemental RI resource belongs or a resource structure corresponding to the transmission period may be allocated or specified for transmission of supplemental channel state information. A method for allocating every $L_{CQI}$-th resource of the existing PMI and CQI resources within the transmission period as supplemental PMI and CQI resources may be considered.

As a method other than the semi-static scheme, if a DPS scheme is selected from among CoMP schemes, when the number of times of which one BS in a CoMP group is selected as a TP is M or more, transmission resources of the supplemental channel state information may be allocated from the $(M+1)^{th}$ RI transmission resource as shown in FIG. 10. At this time, another condition may be added in the semi-static scheme according to a network management scheme, for example, a threshold of the number of times of transmission of the existing channel state information. For example, a threshold of system loss which may be generated by transmission delay of the existing channel state information due to transmission of supplemental channel state information is further set. If channel change is sufficiently slow at an $(M+1)^{th}$ transmission time point, the supplemental channel state information is transmitted instead of the existing channel state information and, otherwise, the existing channel state information selected by the DPS scheme is transmitted. Here, $L_{RI}$, $L_{CQI}$ and M may be transmitted from BS(s) to the UE through a higher layer signal.

The speed of the channel change (slow or fast) may be determined by the BS through periodic channel state information report from the UE. For example, the BS may detect a difference between the received $(M-1)^{th}$ channel state information and the received $M^{th}$ channel state information so that the channel change can be detected. The channel change may include a difference in channel size according to CQI or a difference in channel direction according to PMI.

If an amount of the channel change exceeds a threshold, the BS may instruct the UE to transmit supplemental channel state information in an $(M+1)^{th}$ transmission period or time-frequency resource of channel state information transmission.

In addition, the UE may compare the amount of the channel change with the threshold and if the amount of the channel change exceeds the threshold, the UE may transmit supplemental channel state information in the $(M+1)^{th}$ transmission period or time-frequency resource of channel state information transmission. At this time, since the BS is also aware of the amount of the channel change through the report of the channel state information, the BS may determine whether the channel state information transmitted by the UE is supplemental channel state information.

Referring to FIG. 10, time-frequency resources for channel state information are allocated for channel state information for $P_i$ determined as a TP in the DPS scheme. In this state, channel state information of other TPs belonging to the CoMP set, for example, $P_j$ may be transmitted, in order to cope with switching of the CoMP scheme. The channel state information for $P_j$ corresponds to supplemental channel state information and such supplemental channel state information may be periodically transmitted. In the transmission structure of the channel state information shown in FIG. 10, a dotted line corresponds to a period for transmitting supplemental channel state information for $P_j$ and a first (left) hatched box denotes time-frequency resources allocated for transmission of the RI of the supplemental channel state information, and a second (right) hatched box denotes time-frequency resources allocated for transmission of the PMI/CQI of the supplemental channel state information. As shown in FIG. 10, channel state information for $P_i$ and the channel state information for $P_j$ may be transmitted within the period for transmitting the supplemental channel state information.

Figure 11:
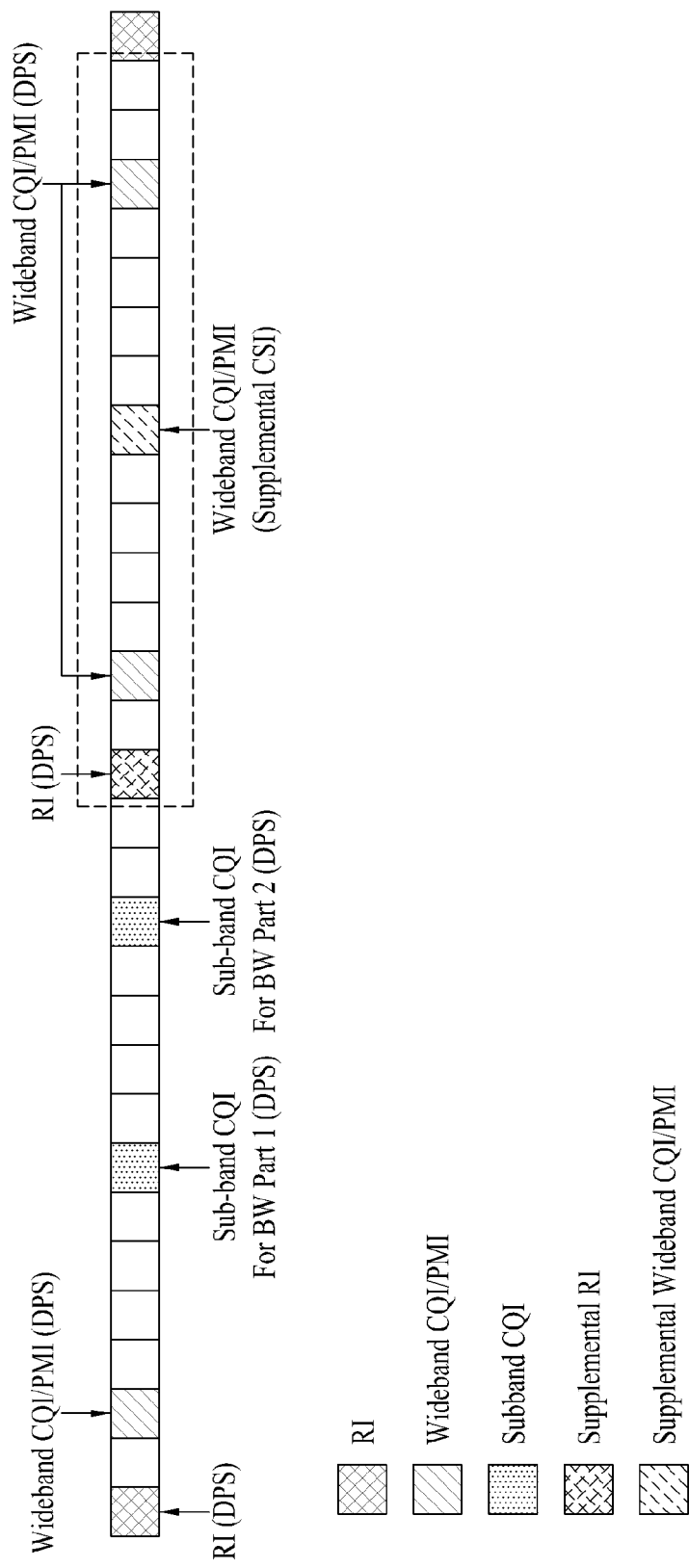
FIG. 11 is a diagram showing an example of a time-frequency structure of an uplink control channel according to an embodiment of the present invention.

FIG. 11 is a diagram showing an example of a channel state information transmission structure of an uplink control channel according to an embodiment of the present invention. According to the embodiment of the present invention, a method for long-term channel information and wideband channel information is proposed without distinguishing between the existing channel state information and the supplemental channel state information, instead of transmitting channel information in a period for transmitting the supplemental channel state information. The supplemental channel state information is not used for the current CoMP scheme but is used to switch the CoMP scheme. Since resources allocated for channel state information is restricted, it is necessary to restrict channel information transmittable for the supplemental channel state information. In addition, if the existing PMI and CQI resources consecutively transmitted within the RI transmission periodicity include unequal channel information as shown in FIG. 9(a) or 9(b), the structure of the existing channel state information may be damaged when borrowing the resources for the supplemental channel state information.

In other words, referring to FIG. 9(a), the UE should transmit a wideband CQI/PMI, a subband CQI, a first wideband PMI and a wideband CQI/second PMI in order to report the channel state information for one BS (or TP). However, if the resources allocated for the above-described channel state information are reallocated as the resources for the supplemental channel state information, the BS acquires incomplete information on the channel. Accordingly, a method for transmitting only an RI and wideband channel state information may be used without distinguishing between the existing channel state information and the supplemental channel state information in the transmission period of the supplemental channel state information. For example, FIG. 11 shows the structure for transmitting the existing channel state information and the supplemental channel state information as wideband channel state information according to the embodiment of the present invention in the period (the transmission period of the supplemental channel state information) for transmitting the supplemental channel state information for $P_2$ when subband CQI transmission for $P_1$ selected by the DPS is supported. Referring to FIG. 11, wideband channel state information for $P_1$ and wideband supplemental channel state information for $P_2$ may be transmitted in the period for transmitting the supplemental channel state information indicated by a dotted box.

Table 3 shows the configuration in which the PMI and CQI is restricted to wideband channel state information transmittable in one subframe in an antenna structure of 4 ports or less (that is, 1 port, 2 ports or 4 ports) and an antenna structure of eight ports.

TABLE 3

| Antenna configuration | channel state information |
|---|---|
| 1, 2, 4 port | Wideband-CQI + PMI |
| 8 port | Wideband CQI + 1st PMI + 2nd PMI |

In the antenna structure of four ports or less, a method for transmitting only an RI and a method for simultaneously transmitting an RI together with a wideband CQI and PMI are considered. In the antenna structure of eight ports, a method for transmitting only an RI and a method for simultaneously transmitting a primary/secondary PMI and a wideband CQI in one transmission period for the supplemental channel state information are considered. If the wideband CQI and PMI is transmitted as the supplemental channel state information, the RI may be assumed to be 1 and may be omitted as necessary.

Figure 12:
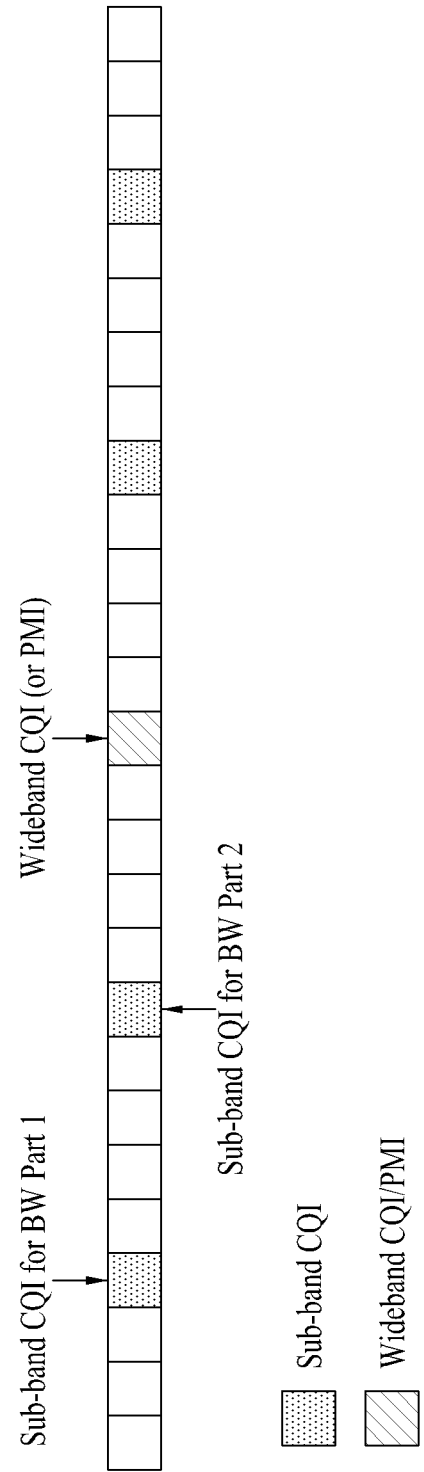
FIG. 12 is a diagram showing an example of a time-frequency structure of an uplink control channel according to an embodiment of the present invention.

FIG. 12 is a diagram showing an example of a structure of channel state information of an uplink control channel according to an embodiment of the present invention. In the embodiment of the present invention, when one CoMP scheme is switched to another CoMP scheme requiring a channel state information feedback loop of TPs for which the supplemental channel state information was transmitted, the transmission structure of an initial channel state information considering the supplemental channel state information will be described. In other words, for example, if a DPS scheme is switched to a JT scheme for a CoMP set including a BS corresponding to a TP and other TPs which were neighboring base stations and for which the supplemental channel stat information is transmitted before switching, the transmission structure of channel state information in an initial period after switching will be described.

When the supplemental channel state information includes a wideband CSI (e.g., a PMI or a CQI), the wideband channel state information may be omitted in the transmission structure of initial channel state information after switching of the CoMP scheme. That is, since the wideband channel state information transmitted via the supplemental channel state information is valid during a predetermined period after switching of the CoMP scheme, it is able to immediately transmit subband channel state information. Accordingly, the transmission structure of the channel state information excluding initial wideband channel state information feedback may be considered as shown in FIG. 12.

Figure 13:
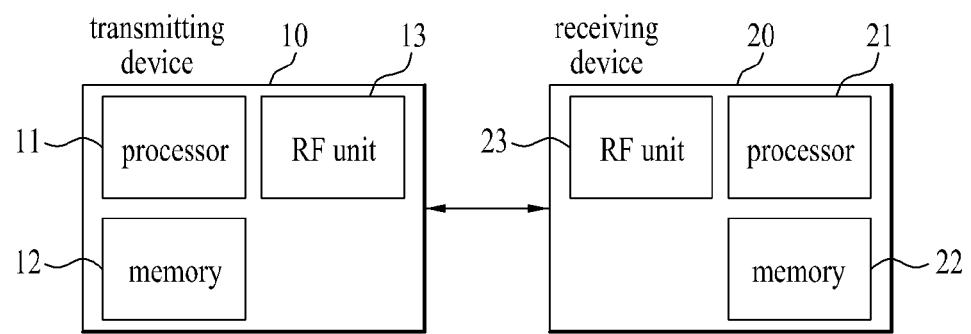
FIG. 13 is a block diagram of an apparatus for transmitting and receiving an uplink control channel according to an embodiment of the present invention.

FIG. 13 is a block diagram showing components of a transmission apparatus 10 and a reception apparatus 20, both of which perform an embodiment of the present invention. The transmission apparatus 10 and the reception apparatus 20 include radio frequency (RF) units 13 and 23 for transmitting or receiving an RF signal carrying information and/or data, a signal and a message, memories 12 and 22 for storing a variety of information associated with communication in a wireless communication system, and processors 11 and 21 operatively connected to the components such as the RF units 13 and 23 and the memories 12 and 22 and configured to control the RF units 13 and 23 and the memories 12 and 22 so as to perform at least one of the embodiments of the present invention, respectively.

The memories 12 and 22 may be configured to store program for processing and controlling the processors 11 and 21 and may be configured to temporarily store input/output information. The memories 12 and 22 may be configured to be used as buffers.

The processors 11 and 21 may be configured to generally provide overall control the modules of the transmission apparatus or the reception apparatus. Especially, the processors 11 and 21 may be configured to carry out various control functions for performing the present invention. The processors 11 and 21 may also be referred to as controllers, microcontrollers, microprocessors, microcomputers, etc. The processors 11 and 21 may be configured as hardware, firmware, software, or a combination thereof. If the present invention is implemented using hardware, the processors 11 and 21 may include one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), which are configured to perform the present invention. If the present invention is implemented using firmware or software, firmware or software may be configured to include a module, a procedure, a function, etc. for performing functions or operations of the present invention. The firmware or software configured to perform the present invention may be provided in the processors 11 and 21, or may be stored in the memories 12 and 22 and executed by the processors 11 and 21.

The processor 11 of the transmission apparatus 10 may be configured to perform predetermined coding and modulation upon signals and/or data, which are scheduled by the processor 11 or a scheduler connected to the processor 11 and transmitted to the external devices, and then transmit the modulated signals and/or data to the RF unit 13. For example, the processor 11 may be configured to convert a transmission data stream into K layers by demultiplexing, channel coding, modulation, etc. The encoded signal streams are called codewords and are equivalent to the transport blocks which are data blocks provided by a medium access control (MAC) layer. One transport block (TB) is coded into one codeword and each codeword is transmitted to the reception apparatus in the form of one or more layers. For frequency up-conversion, the RF unit 13 may include an oscillator. The RF unit 13 may include Nt (Nt being a positive integer) transmit antennas.

The signal processing procedure of the reception apparatus 20 is reverse to the signal processing procedure of the transmission apparatus 10. Under control of the processor 21, the RF unit 23 of the reception apparatus 20 receives an RF signal from the transmission apparatus 10. The RF unit 23 may include Nr (Nr being a positive integer) receive antennas. The RF unit 23 may be configured to perform frequency down-conversion with respect to the signal received via the receive antennas and restore a baseband signal. The RF unit 23 may include an oscillator for frequency down-conversion. The processor 21 may be configured to perform decoding and demodulation of the RF signal received via the receive antennas and restore data transmitted by the transmission apparatus 10.

The RF units 13 and 23 may include one or more antennas. The antenna may be configured to serve to transmit the signals processed by the RF units 13 and 23 to external devices or to receive signals from external devices and transmit the signals to the RF units 13 and 23 according to one embodiment of the present invention, under control of the processors 11 and 21. Each antenna may be composed of one physical antenna or a combination of more than one physical antenna element. The signal transmitted by each antenna is not further decomposed by the reception apparatus 20. A reference signal (RS) transmitted in correspondence with the antenna defines an antenna from the viewpoint of the reception apparatus 20 and the reception apparatus 20 is allowed to perform channel estimation of the antenna regardless of whether a channel is a single radio channel from one physical antenna or a composite channel from a plurality of physical antenna elements including the antenna. That is, the antenna is defined such that a channel for transmitting symbols through the antenna is derived from the channel for transmitting other symbols through the same antenna. In case of an RF unit supporting a multiple input multiple output (MIMO) function for transmitting and receiving data using multiple antennas, two or more antennas may be connected.

In the embodiments of the present invention, a UE or a relay operate as the transmission apparatus 10 in uplink and operates as the reception apparatus 20 in downlink. In the embodiments of the present invention, a BS operates as the reception apparatus 20 in uplink and operates as the transmission apparatus 10 in downlink.

Hereinafter, in description of the embodiments of the present invention, the processor, the memory and the RF unit included in the BS are respectively referred to as a BS processor, a BS memory and a BS RF unit, the processor, the memory and the RF unit included in the UE are respectively referred to as a UE processor, a UE memory and a UE RF unit. In the present invention, the BS processor may be a processor located at a BS or may be a BS controller connected to the BS via a cable or a dedicated line and configured to control the BS.

The UE processor may be configured to receive resource allocation information on allocation of time-frequency resources used to transmit supplemental channel state information for a neighboring BS from a serving BS of the UE. As shown in FIG. 10 or 11, time-frequency resources used to transmit the supplemental channel state information may be allocated to the unit resource structure of repetition or periodicity in the repeated or periodic time-frequency resource structure allocated for transmission of the channel state information of the serving BS. The UE processor may be configured to enable the UE RF unit to transmit the supplemental channel state information for the neighboring BS using part of time-frequency resources allocated for transmission of the channel state information of the serving BS based on the resource allocation information. The unit resource structure corresponds to one transmission period and the supplemental channel state information for the neighboring BS may be periodically transmitted to the BS. The resource allocation information may be transmitted from the BS to the UE through a higher layer signal.

The UE processor may be configured to enable the UE RF unit to transmit the channel state information for the serving BS and the supplemental channel state information for the neighboring BS in the period for transmitting the supplemental channel state information. In addition, in order to prevent the transmission structure of the channel state information transmitted to at least one BS from being damaged, both the channel state information for the serving BS and the supplemental channel state information for the neighboring BS transmitted in the period for transmission of the supplemental channel state information may be wideband channel state information. In addition, in the wireless communication system to which the CoMP scheme is applied, since the channel state information may be fed back to two or more BSs, in order to identify the information about the BSs to which the channel state information is fed back, the UE processor may be configured to add identification information of the serving BS or the neighboring BS to the channel state information for the serving BS and the supplemental channel state information for the neighboring BS.

After switching the CoMP scheme, since the wideband channel state information for the serving BS is provided by the wideband supplemental channel state information transmitted before switching the CoMP scheme, the wideband channel state information for the serving BS may not be transmitted during a predetermined period. Accordingly, after switching the CoMP scheme, for example, the serving BS of the UE is switched to the neighboring BS, the UE processor may be configured to transmit only the subband channel state information for the switched serving BS through the UE RF unit during a predetermined period after switching. In addition, the BS processor may be configured to enable the RF unit to transmit resource allocation information of time-frequency resources used to transmit the supplemental channel state information for the neighboring BS to the UE.

In addition, the BS processor may be configured to receive the supplemental channel state information for the neighboring BS based on the resource allocation information from the UE. The resource allocation information is transmitted to the UE through a higher layer signal and time-frequency resources used to transmit the supplemental channel state information for the neighboring BS may be part of time-frequency resources allocated for transmission of the channel state information for the serving BS.

It is apparent to those skilled in the art that the present invention is applicable to a communication system to which other communication schemes are applied instead of the CoMP system.

As described above, according to the embodiments of the present invention, part of time-frequency resources for transmitting the existing channel state information may be allocated as resources for transmitting the supplemental channel state information to transmit the supplemental channel state information for the neighboring BS other than the serving BS and may be used to estimate the channel state during an initial period after changing the serving BS due to switching of the CoMP scheme. The supplemental channel state information may use part of the time-frequency resources for transmitting the existing channel sate information so as not to deteriorate the report function of the existing channel state information without additional time-frequency resources.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention may be used in a base station, a user equipment or other apparatuses in a wireless communication system.

The invention claimed is:

1. A method for, at a user equipment (UE) served by a coordinated multiple point transmission and reception (CoMP) set in which a plurality of base stations participate in a wireless communication system, transmitting channel state information to at least one of the base stations, the method comprising:
receiving, from a serving base station of the UE, resource allocation information on allocation of time-frequency resources used to transmit supplemental channel state information for at least one neighboring base station which does not participate in an ongoing CoMP scheme; and
transmitting supplemental channel state information for the at least one neighboring base station to the serving base station, using part of time-frequency resources allocated for transmission of channel state information for the serving base station, based on the resource allocation information,
wherein the supplemental channel state information is used to determine a CoMP scheme to be changed or replace channel state information for the at least one neighboring base station until the channel state information for the at least one neighboring base station is obtained when the at least one neighboring base station participates in the changed CoMP scheme.

2. The method according to claim 1, wherein the supplemental channel state information for the at least one neighboring base station is periodically transmitted.

3. The method according to claim 1, wherein the channel state information for the serving base station and the supplemental channel state information for the at least one neighboring base station are transmitted together in a period for transmission of the supplemental channel state information.

4. The method according to claim 3, wherein both the channel state information for the serving base station and the supplemental channel state information for the at least one neighboring base station transmitted in the period for transmission of the supplemental channel state information are wideband channel state information.

5. The method according to claim 1, wherein the resource allocation information is transmitted via a higher layer signal.

6. The method according to claim 1, further comprising adding identification information for the serving base station or the at least one neighboring base station to the channel state information for the serving base station and the supplemental channel state information for the at least one neighboring base station, respectively.

7. The method according to claim 1, further comprising:
transmitting only subband channel state information for a first base station of the at least one neighboring base station during a predetermined period after switching the serving base station to the first base station.

8. A user equipment (UE) which is served by a coordinated multiple point transmission and reception (CoMP) set in which a plurality of base stations participate in a wireless communication system and transmits channel state information to at least one of the base stations, the UE comprising:
a processor,
wherein the processor is configured to receive, from a serving base station of the UE, resource allocation information on allocation of time-frequency resources used to transmit supplemental channel state information for at least one neighboring base station, which does not participate in an ongoing CoMP scheme, and transmit supplemental channel state information for the at least one neighboring base station to the serving base station using part of time-frequency resources allocated for transmission of the channel state information for the serving base station based on the resource allocation information, and
wherein the supplemental channel state information is used to determine a CoMP scheme to be changed or replace channel state information for the at least one neighboring base station until the channel state information for the at least one neighboring base station is obtained when the at least one neighboring base station participates in the changed CoMP scheme.

9. The UE according to claim 8, wherein the supplemental channel state information for the at least one neighboring base station is periodically transmitted.

10. The UE according to claim 8, wherein the processor is configured to enable the RF unit to transmit the channel state information for the serving base station and the supplemental channel state information for the at least one neighboring base station together in a period for transmission of the supplemental channel state information.

11. The UE according to claim 10, wherein both the channel state information for the serving base station and the supplemental channel state information for the at least one neighboring base station transmitted in the period for transmission of the supplemental channel state information are wideband channel state information.

12. The UE according to claim 8, wherein the resource allocation information is transmitted via a higher layer signal.

13. The UE according to claim 8, wherein the processor is configured to add identification information of the serving base station or the at least one neighboring base station to the channel state information for the serving base station and the supplemental channel state information for the at least one neighboring base station, respectively.

14. The UE according to claim 8, wherein the processor is configured to transmit only subband channel state information for a first base station of the at least one neighboring base station through the RF unit during a predetermined period after switching the serving base station to the first base station.

15. A method for, at a base station belong to a coordinated multiple point transmission and reception (CoMP) set consisting of a plurality of base stations, receiving channel state information from a user equipment (UE) in a wireless communication system, the method comprising:
transmitting, to the UE, resource allocation information of time-frequency resources used to transmit supplemental channel state information for at least one neighboring base station which does not participate in ongoing CoMP scheme; and
receiving, from the UE, the supplemental channel state information for the at least one neighboring base station based on the resource allocation information,
wherein the time-frequency resources used to transmit the supplemental channel state information for the at least one neighboring base station are part of time-frequency resources allocated for transmission of the channel state information of the base station, and
wherein the supplemental channel state information is used to determine a CoMP scheme to be changed or replace channel state information for the at least one neighboring base station until the channel state information for the at least one neighboring base station is obtained when the at least one neighboring base station participates in the changed CoMP scheme.

* * * * *